US005278595A

United States Patent [19]
Nishida et al.

[11] Patent Number: 5,278,595
[45] Date of Patent: Jan. 11, 1994

[54] LIQUID CRYSTAL TYPE REAR-PROJECTION TELEVISION WITH A REDUCED CABINET DEPTH

[75] Inventors: Masami Nishida; Masataka Izawa; Tadashi Yoshida, all of Tokyo, Japan

[73] Assignee: Pioneer Electronic Corporation, Tokyo, Japan

[21] Appl. No.: 957,007

[22] Filed: Oct. 6, 1992

[30] Foreign Application Priority Data

Oct. 7, 1991 [JP] Japan ............................. 3-259480
Apr. 24, 1992 [JP] Japan ............................. 4-106461

[51] Int. Cl.$^5$ ............................................. G03B 21/28
[52] U.S. Cl. ................................. 353/78; 353/74; 353/119
[58] Field of Search ............... 353/37, 31, 74, 77, 353/78, 98, 99, 119; 358/60, 231

[56] References Cited

U.S. PATENT DOCUMENTS

| | | | |
|---|---|---|---|
| 3,947,104 | 3/1976 | Waly et al. | 353/78 |
| 4,875,064 | 10/1989 | Umeda et al. | 353/78 |
| 4,941,732 | 7/1990 | Umeda et al. | 353/78 |
| 4,961,642 | 10/1990 | Ogino | 353/74 |
| 5,096,288 | 3/1992 | Yaho et al. | 353/69 |
| 5,097,323 | 3/1992 | Sato et al. | 353/34 |

Primary Examiner—William A. Cuchlinski, Jr.
Assistant Examiner—William C. Dowling
Attorney, Agent, or Firm—Finnegan, Henderson, Farabow, Garrett & Dunner

[57] ABSTRACT

A liquid crystal projector is obliquely disposed in a lower front portion of a cabinet. A first mirror for reflecting light beams of R, G and B coming from the liquid crystal projector is disposed obliquely with respect to the top-bottom, right-left and front-rear directions of the cabinet. A second mirror is disposed so as to be inclined toward a screen. With this configuration, the optical axis of the light beams that extends from the liquid crystal projector to the screen is folded back three-dimensionally. In the liquid crystal projector, the optical axis of a condensing reflector may be slightly inclined from the central axis of a projection lens.

7 Claims, 11 Drawing Sheets

LIQUID CRYSTAL TYPE REAR-PROJECTION TELEVISION WITH A REDUCED CABINET DEPTH

BACKGROUND OF THE INVENTION

The present invention relates to a liquid crystal type rear-projection television which, in particular, has a thinner cabinet.

Figure 1:
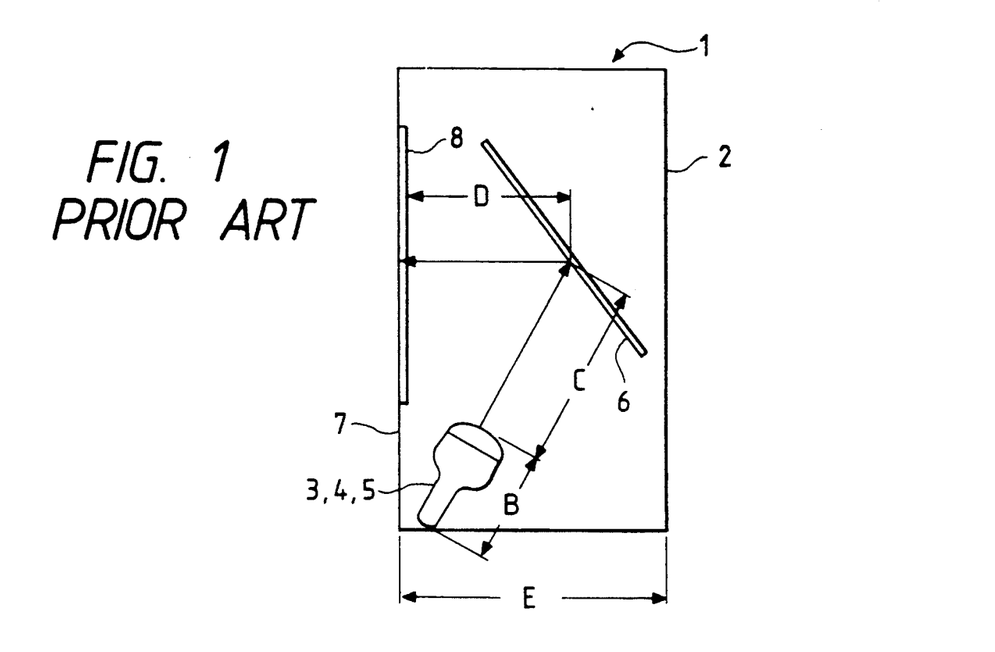
FIG. 1 is a schematic side view of a conventional CRT-type rear-projection television.
Figure 2:
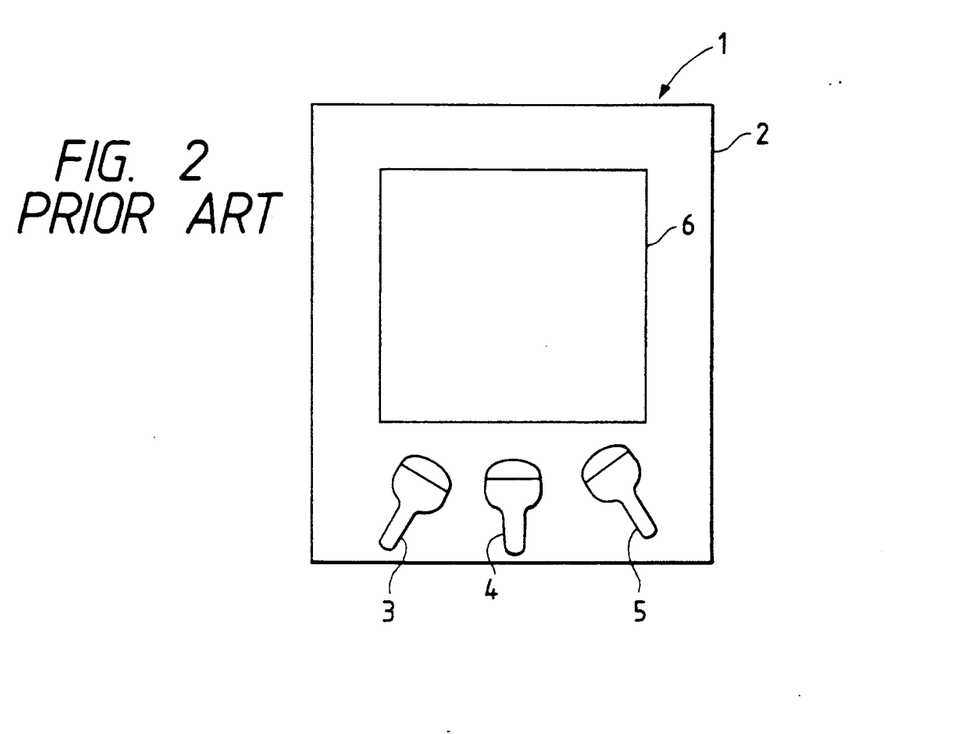
FIG. 2 is a schematic front view of the conventional CRT-type rear-projection television of FIG. 1.

FIGS. 1 and 2 show a conventional CRT-built-in-type rear-projection television 1. CRTs 3-5 of red (R), green (G) and blue (B) are incorporated in a cabinet 2. Light beams of the respective colors emitted from the respective CRTs 3-5 and carrying respective images are reflected by a mirror 6 that is obliquely disposed in the cabinet 2, and then the respective images are projected onto the rear surface of a screen 8 that is disposed at a front portion 7 of the cabinet 2, to form a color image on the front surface of the screen 8.

The rear-projection television 1 is usually placed in a house room or an office, and the cabinet 2, which is usually large, occupies a wide space of the room. The above configuration including the inclined mirror 6 is employed to reduce the depth (thickness) of the cabinet 2, to thereby save the room space.

Since the CRTs 3-5 are also large, they occupy a large part of the whole rear projection television 1. If the rear-projection television 1 has a diagonal size of 40 inches (600 mm vertically and 800 mm horizontally), the axial length B of the respective CRTs 3-5 is about 450 mm. Due to limitations from the magnification and peripheral performance of projection lenses, an optical path length C+D from each of the CRTs 3-5 to the screen 8 should be at least about 800 mm. Since the television 1 is for home use, the height of the cabinet 2 is designed to be about 1,100 mm. Therefore, in order to obtain the above length C+D, the thickness E of the cabinet 2 should be at least about 470 mm.

As long as designed according to the above conventional design concept, the cabinet thickness of 40-inch CRT-type rear-projection televisions cannot be made smaller than about 450 mm.

On the other hand, liquid crystal type rear-projection televisions have been proposed recently which employ a liquid crystal projector instead of CRTs. The liquid crystal projector includes three liquid crystal panels of R, G and B, and light beams carrying respective three images are output from a single projection lens. However, even in such liquid crystal type rear-projection televisions, the liquid crystal panels and the projection lens are disposed at the position of the center CRT 4 of the CRT-type projection television 1, and the light beams emitted from the liquid crystal projector are reflected by a mirror and made incident on a screen.

In the liquid crystal type rear-projection televisions having the single projection lens, although the cabinet thickness can be made smaller than the CRT-type projection televisions, there still exists a certain limit of the cabinet thickness that originates, for instance, from an increased projection length of the liquid crystal projector. Further, some problems remain unsolved in the convergence adjustment.

SUMMARY OF THE INVENTION

The present invention has been made in view of the above circumstances, and has an object of providing a liquid crystal type rear-projection television having a thinner cabinet.

According to the invention, a liquid crystal type rear-projection television comprises a liquid crystal projector including light source means, liquid crystal panels for red, green and blue and a projection lens, for producing light beams of red, green and blue that carry a color image by making white light provided by the light source means pass through the liquid crystal panels, and for outputting the light beams through the projection lens.

The liquid crystal type rear-projection television further comprises at least two mirrors for sequentially reflecting the light beams coming from the liquid crystal projector and a screen for receiving, at its rear surface, the light beams reflected from a last one of the two mirrors to display the color image at its front surface.

The liquid crystal projector and the two mirrors are arranged so that an optical axis of the light beams extending from the liquid crystal projector to the screen is folded back three-dimensionally.

Further, in the liquid crystal projector, the optical axis of the light source means may be slightly inclined from the central axis of the projection lens.

DESCRIPTION OF THE PREFERRED EMBODIMENTS

Referring to FIGS. 3-6, a liquid crystal type rear-projection television according to a first embodiment of the present invention is described.

Figure 3:
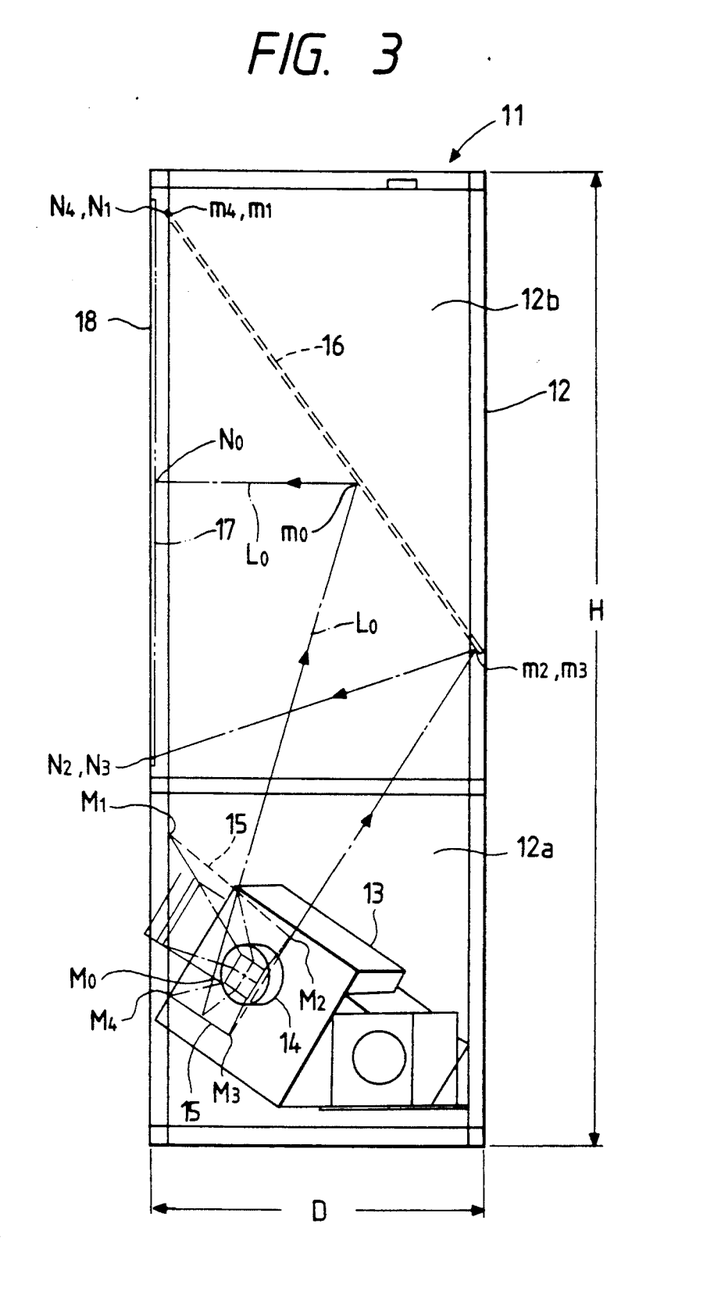
FIG. 3 is a side view showing an internal structure of a liquid crystal type rear-projection television according to a first embodiment of the present invention.
Figure 4:
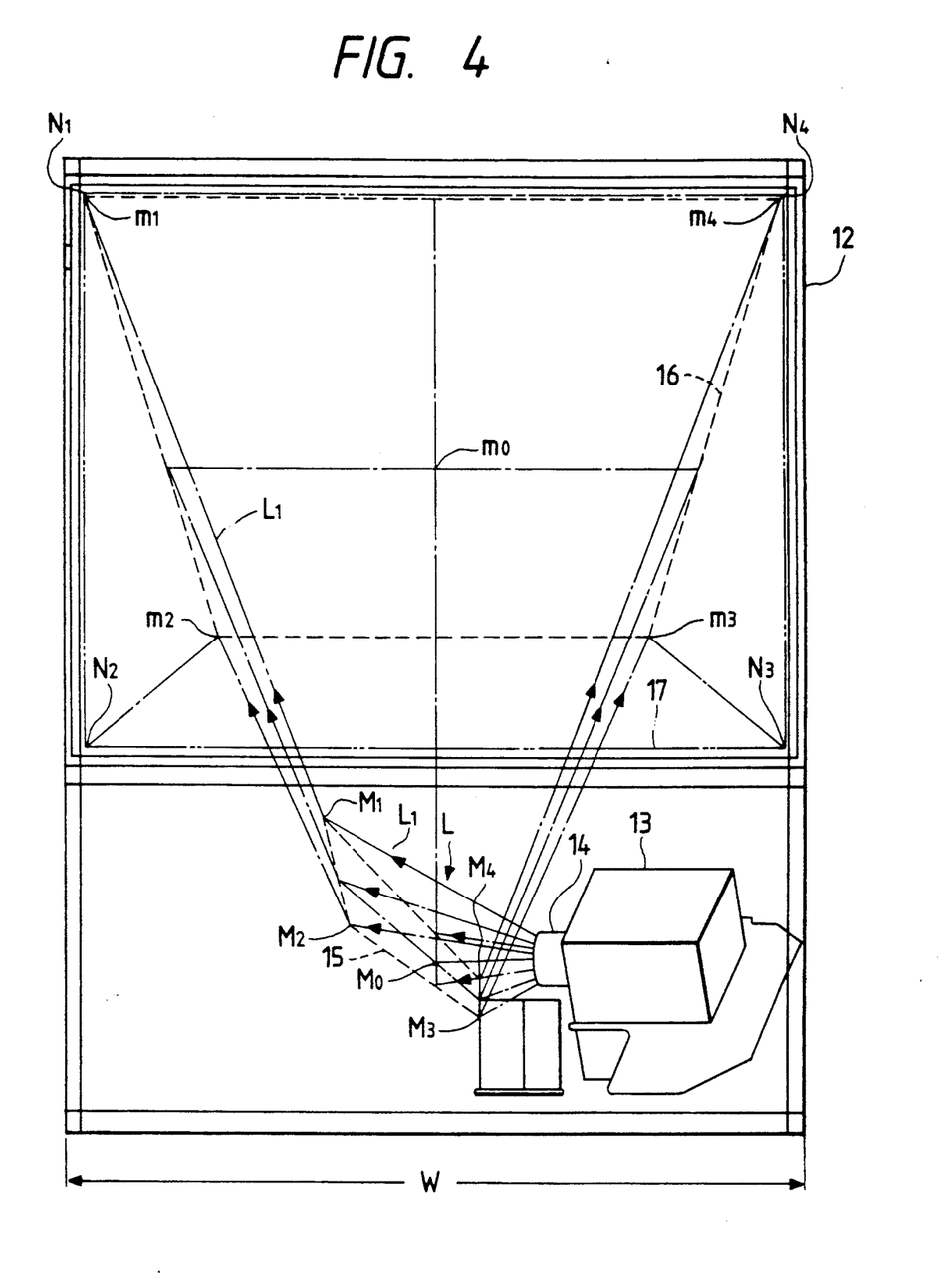
FIG. 4 is a rear view of the rear-projection television of FIG. 3.

As shown in FIGS. 3 and 4, a liquid crystal projector 13 is obliquely disposed in a lower portion 12a of a cabinet 12 of a liquid crystal type rear-projection television 11. Being incorporated with liquid crystal panels of R, G and B, the liquid crystal projector 13 emits light beams L from a projection lens 14. Two mirrors for sequentially reflecting the light beams L coming from the liquid crystal projector 13 are provided in the cabinet 12 (at least two mirrors are required). More specifically, a first mirror 15 is obliquely disposed on the front side of the lower portion 12a of the cabinet 12 and reflects the light beams L coming from the liquid crystal projector 13. A second mirror 16 is disposed in an upper portion 12b of the cabinet 12 so as to be inclined toward the front side and reflects the light beams L reflected from the first mirror 15. A screen 17 is disposed at the front portion of the cabinet 12. The light beams L reflected from the second mirror 16 are made incident on the rear surface of the screen 17, as a result of which a color image is formed on a front surface 18 of the screen 17.

The first mirror 15 is disposed obliquely with respect to the top-bottom direction, right-left direction (right-left direction in FIG. 4) and front-rear direction (right-left direction in FIG. 3) of the cabinet 12. As indicated by the dashed line and symbols $M_1$-$M_4$ in FIGS. 3 and 4, the first mirror 15 has an irregular tetragon reflection plane. As indicated by the dashed line and symbols $m_1$-$m_4$, the second mirror 16 has a trapezoid reflection plane.

In this embodiment, the optical axis of the light beams L is folded back three-dimensionally in the path extending from the liquid crystal projector 13 to the screen 17. That is, a light beam $L_0$ exiting from the center of the projection lens 14 in the direction oblique to the top-bottom, right-left and front-rear directions is first reflected by the first mirror 15 at its center-equivalent position $M_0$, then reflected by the second mirror 16 at its center-equivalent position $m_0$, and finally made incident on the screen 17 at its center position $N_0$. A light beam $L_1$ exiting from the projection lens 14 at its edge position is first reflected by the first mirror 15 at its position $M_1$, then reflected by the second mirror 16 at its position $m_1$, and finally made incident on the screen 17 at its position $N_1$. In the similar manner, the other edge light beams are subjected to two times of reflection and take paths of $M_2 \rightarrow m_2 \rightarrow N_2$, $M_3 \rightarrow m_3 \rightarrow N_3$ and $M_4 \rightarrow m_4 \rightarrow N_4$, respectively, so that a rectangular color image having edges $N_1$-$N_4$ is formed on the screen 17. In this manner, the light beams L emitted from the liquid crystal projector 13 are folded back three-dimensionally by the first and second mirrors 15 and 16 to reach the screen 17. Therefore, by disposing the first and second mirrors 15 and 16 at proper inclination angles with respect to the cabinet 12, a cabinet thickness D can be reduced to 390 mm in the case of a 40-inch liquid crystal type rear-projection television (cabinet 12 has a height H of 1,078 mm and a width W of 860 mm) while a necessary optical path length of about 800 mm from the liquid crystal projector 13 to the screen 17 is secured. This thickness value is smaller than 450 mm of the conventional CRT-type rear-projection television by about 60 mm, which means realization of a thinner cabinet. If the cabinet 12 itself is made thinner by employing a case material of, e.g., aluminum, the thickness D can further be reduced to 370 mm, in which case a 80-mm reduction is attained.

Although the above dimensions vary with the screen inch size, in the liquid crystal type rear-projection television of any screen inch size the thickness D can be reduced to the smallest value which depends on the size of the second mirror 16 that is disposed immediately before the screen 17.

If the central beams of the respective colors reach the screen 17 after being reflected plural times two-dimensionally, i.e., in a plane defined by normals of the mirrors, their loci can be expressed using scalars. However, in the invention, the loci should be expressed in the form of a three-dimensional vector equation:

$$\vec{Nm_2} = a\vec{Nm_1} + b\vec{Y}$$

where a and b are constants, $\vec{Nm_1}$ is a vector along the normal of the first mirror 15, $\vec{Nm_2}$ is a vector along the normal of the second mirror 16, and $\vec{Y}$ is a vector along the shorter axis of the second mirror 16. The three-dimensionally folded light beam locus can be expressed by this equation.

Figure 5:
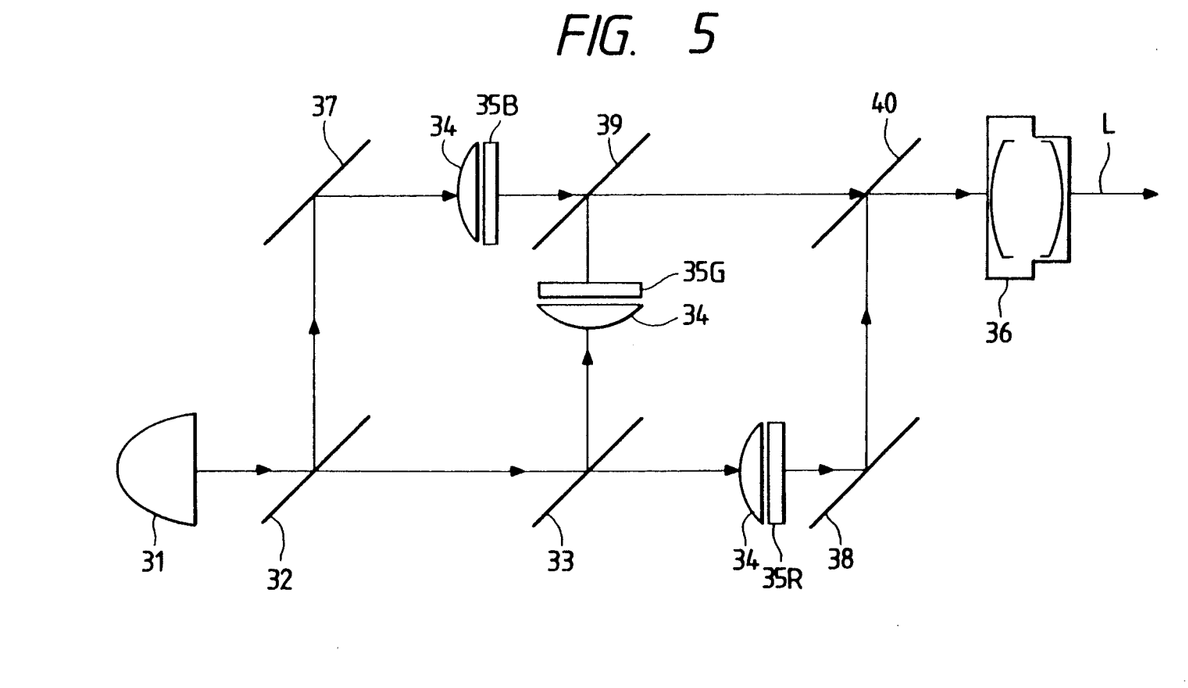
FIG. 5 is an optical system diagram showing the principle of operation of a liquid crystal projector used in the rear-projection television of FIGS. 3 and 4.
Figure 6:
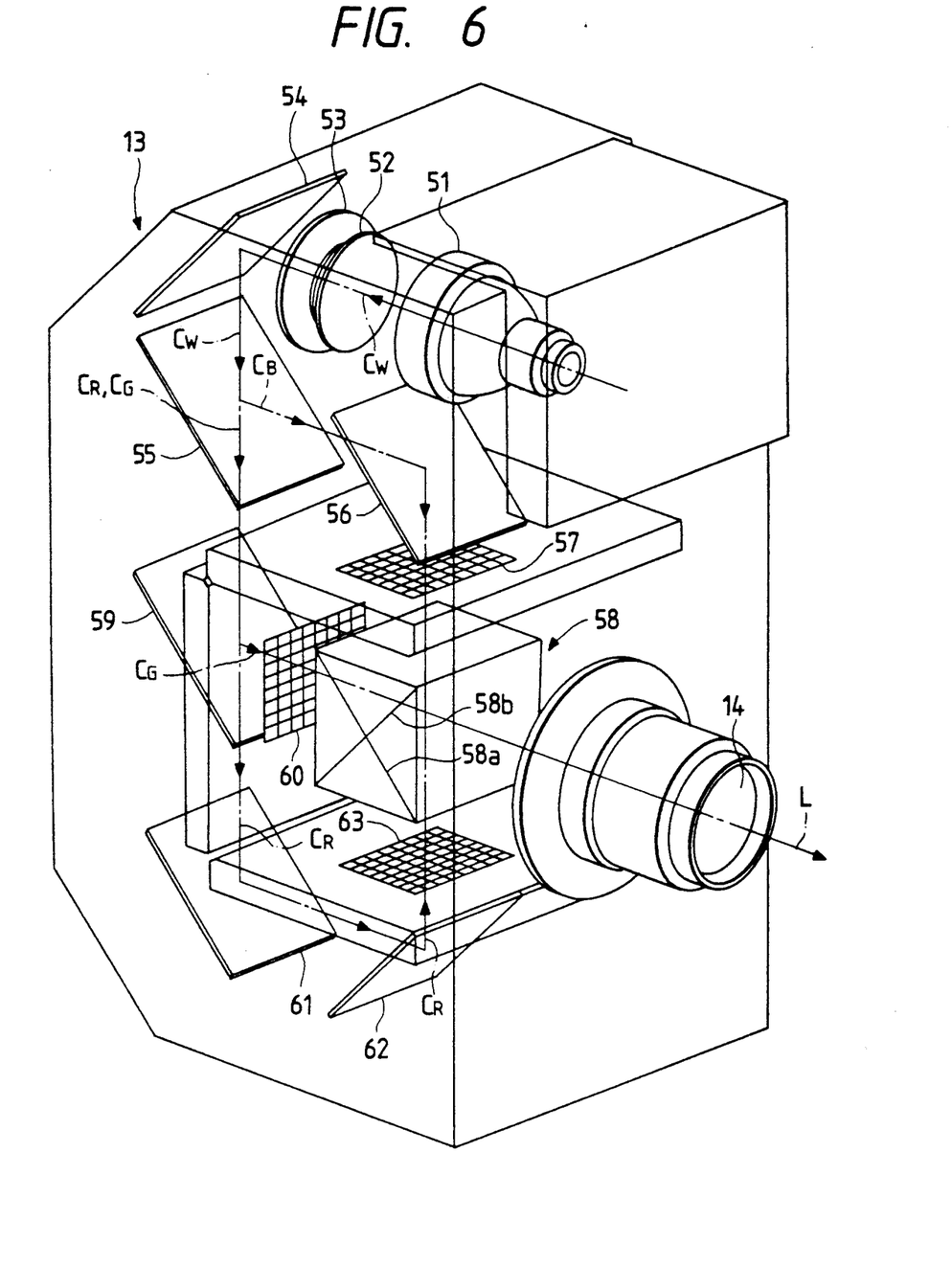
FIG. 6 is a perspective view showing a detailed internal structure of a liquid crystal projector used in the rear-projection television of the first embodiment.

Referring to FIGS. 5 and 6, a structure of the liquid crystal projector 13 is described. FIG. 5 shows the principle of its operation. White light collected by a condensing reflector 31 is separated into red (R) light, green (G) light and blue (B) light by dichroic mirrors 32 and 33, and the light beams of R, G and B are input to liquid crystal panels 35R, 35G and 35B via condenser lenses 34, respectively. The light beams of R, G and B are transmitted or shielded by the respective liquid crystal panels R, G and B whose transmittances are varied in accordance with respective video signals, and output from a projection lens 36 to form light beams L. Reference numerals 37 and 38 represent full-reflection mirrors, and numerals 39 and 40 represent dichroic mirrors.

FIG. 6 shows a detailed internal structure of the liquid crystal projector 13. White light $C_W$ emitted from a light source such as a halogen lamp or metal halide lamp and reflected by a condensing reflector 51 are passed through lenses 52 and 53, for eliminating ultraviolet and infrared components, and is reflected by a full-reflection mirror 54. Then, blue light $C_B$ is reflected by a dichroic mirror 55 while red light $C_R$ and green light $C_G$ are passed through it. After being reflected by a full-reflection mirror 56, the blue light $C_B$ passes through a liquid crystal panel 57 while its transmittance is varied, and enters a three-color combining prism device 58. In the three-color combining device 58, a dichroic mirror 58a reflects the blue light $C_B$ while transmitting the red light $C_R$ and green light $C_G$. Another dichroic mirror 58b reflects the red light $C_R$ while transmitting the green light $C_G$ and blue light $C_B$. Therefore, the blue light $C_B$ is reflected by the dichroic mirror 58a and reaches the projection lens 14.

On the other hand, after being transmitted from the dichroic mirror 55, the green light $C_G$ is reflected by a dichroic mirror 59 while the red light $C_B$ is passed through by it. The green light $C_G$ is passed through a liquid crystal panel 60 while its transmittance is varied. Then, the green light $C_G$ goes straight through the three-color combining prism device 58 and reaches the projection lens 14. Further, the red light $C_R$ transmitted from the dichroic mirror 59 is reflected by full-reflection mirrors 61 and 62. Then, the red light $C_R$ is passed through a liquid crystal panel 63 while its transmittance is varied, and enters the three-color combining prism device 58. After reflected by the dichroic mirror 58b, the red light $C_R$ reaches the projection lens 14. In this manner, the light beams L of three colors (R, G and B) are output from the projection lens 14. The liquid crystal projector 13 having the above structure is small, and can be downsized to, specifically, 370 mm in height, 180 mm in width, 230 mm in depth and 90 mm in lens projection height. Therefore, the liquid crystal projector 13 does not much influences the depth of the rear-projection television 1.

While the above embodiment is described with an assumption that the height and width of the liquid crystal type rear-projection television 1 are the same as the conventional rear-projection television, the cabinet thickness can further be made smaller if a higher cabinet is allowed. Further, while in the above embodiment the magnification of the projection lens 14 is assumed to be the same as the conventional one, it is apparent from the above description that if the magnification is increased the optical path length can be shortened and the cabinet thickness can be reduced accordingly.

A second embodiment of the invention is described with reference to FIGS. 7(a)-14.

Figures 7A, 7B:
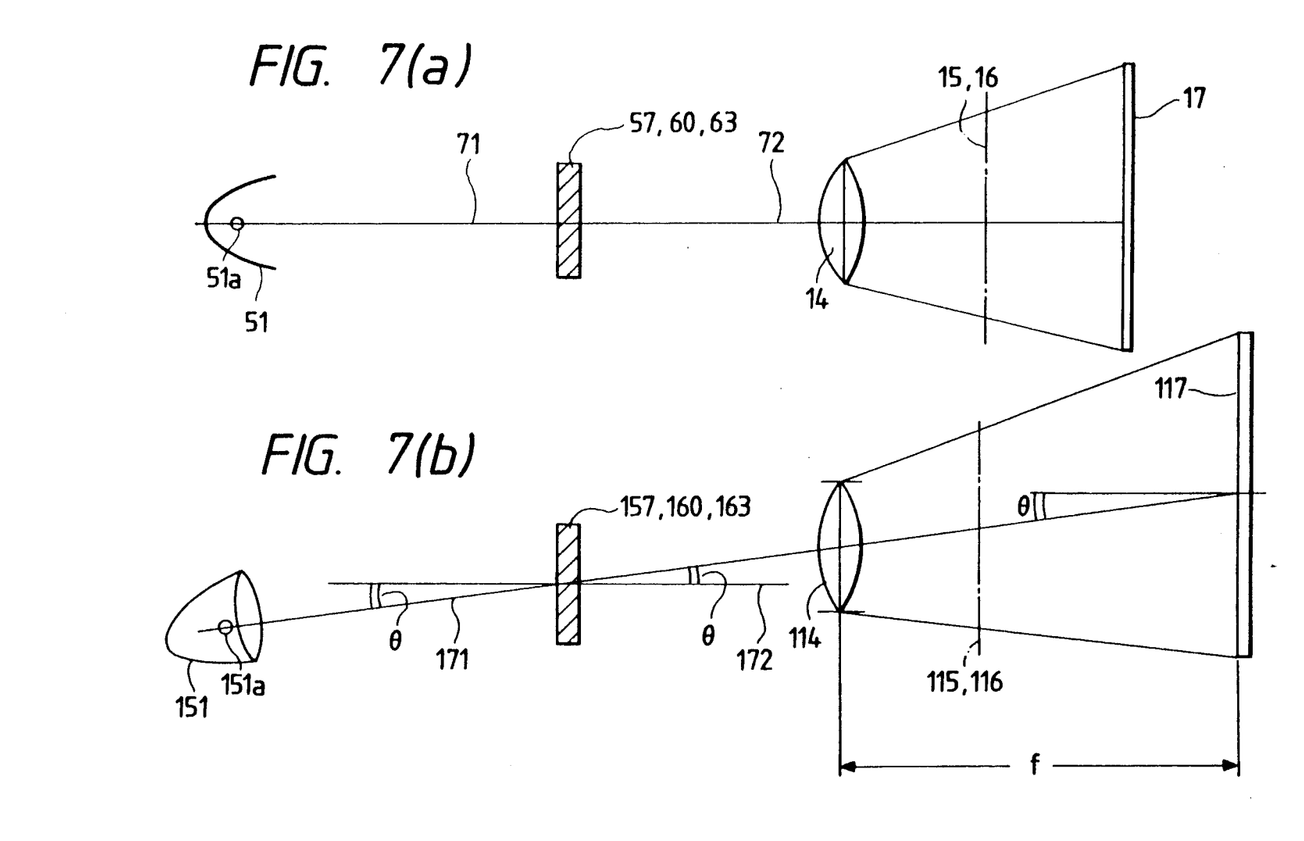
FIG. 7(a) is a schematic optical system diagram of the first embodiment.
FIG. 7(b) is a schematic optical system diagram of a liquid crystal type rear-projection television according to a second embodiment of the invention.

FIG. 7(a) shows the optical system of the first embodiment, in which an optical axis 71 of a condensing reflector 51, which is associated with a light source 51a, coincides with a central axis 72 of the projection lens 14. The light emitted from the light source 51a and reflected by the condensing reflector 51 passes through the liquid crystal panels 63, 60 and 57 for R, G and B, and exits from the projection lens 14. Then, the light beams output from the liquid crystal projector 13 are reflected by the two mirrors 15 and 16 (at least two mirrors are required) and folded back three-dimensionally. The light beams reflected from the second mirror 16 are made incident on the rear surface of the screen 17, so that a color image is formed on the front surface of the screen 17.

On the other hand, the second embodiment of FIG. 7(b) is based on the fact that the cabinet thickness can be reduced if an optical axis 171 of a condensing reflector 151, which is associated with a light source 151a, is slightly inclined from a central axis of a projection lens 114. An inclination angle $\theta$ is preferably several degrees, for instance, 6°. That is, in order to reduce the cabinet thickness of the rear-projection television, the second embodiment employs two mirrors 115 and 116 for folding back two times three-dimensionally the optical axis 171 extending from the reflector 151 to a screen 117 (at least two mirrors are required to effect two times or more reflections), and further employs a structure in which, as described above, the optical axis 171 is inclined from the central axis 172. Reference numerals 163, 160 and 157 represent liquid crystal panels of R, G and B, respectively.

Figure 8:
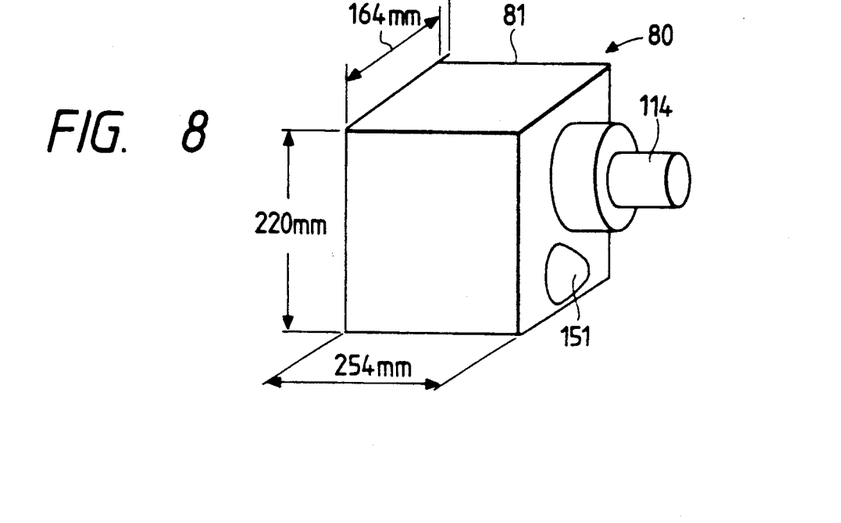
FIG. 8 is a perspective view showing an appearance of a liquid crystal projector used in the rear-projection television of the second embodiment.

FIGS. 8-11 show a liquid crystal projector 80 according to the second embodiment. As shown in FIG. 8, the condensing reflector 151 and the projection lens 114 are attached to a body 81 of the liquid crystal projector 80.

Figure 9:
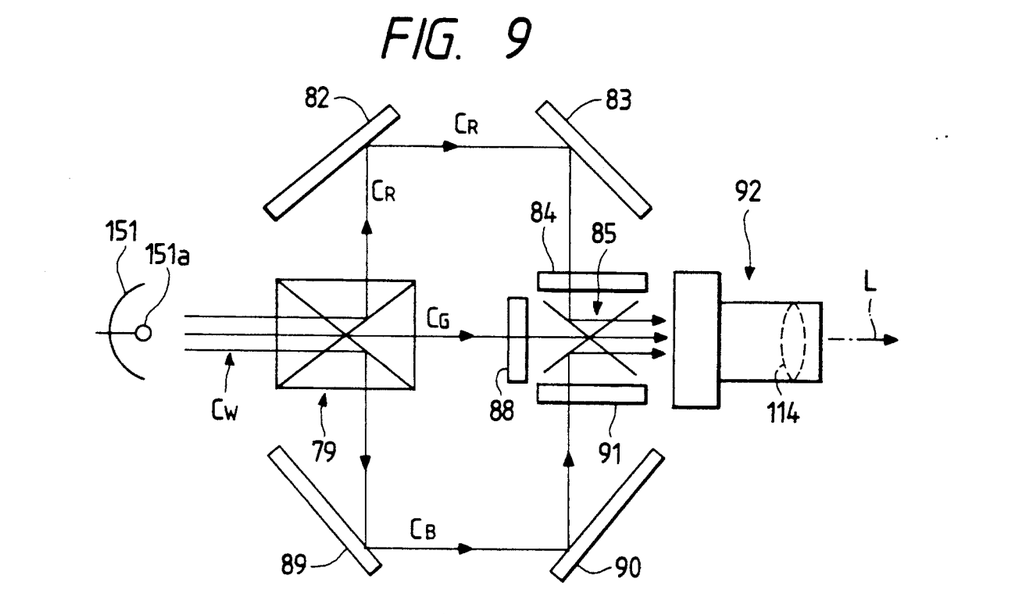
FIG. 9 is an optical system diagram showing the principle of the liquid crystal projector of FIG. 8.
Figure 10:
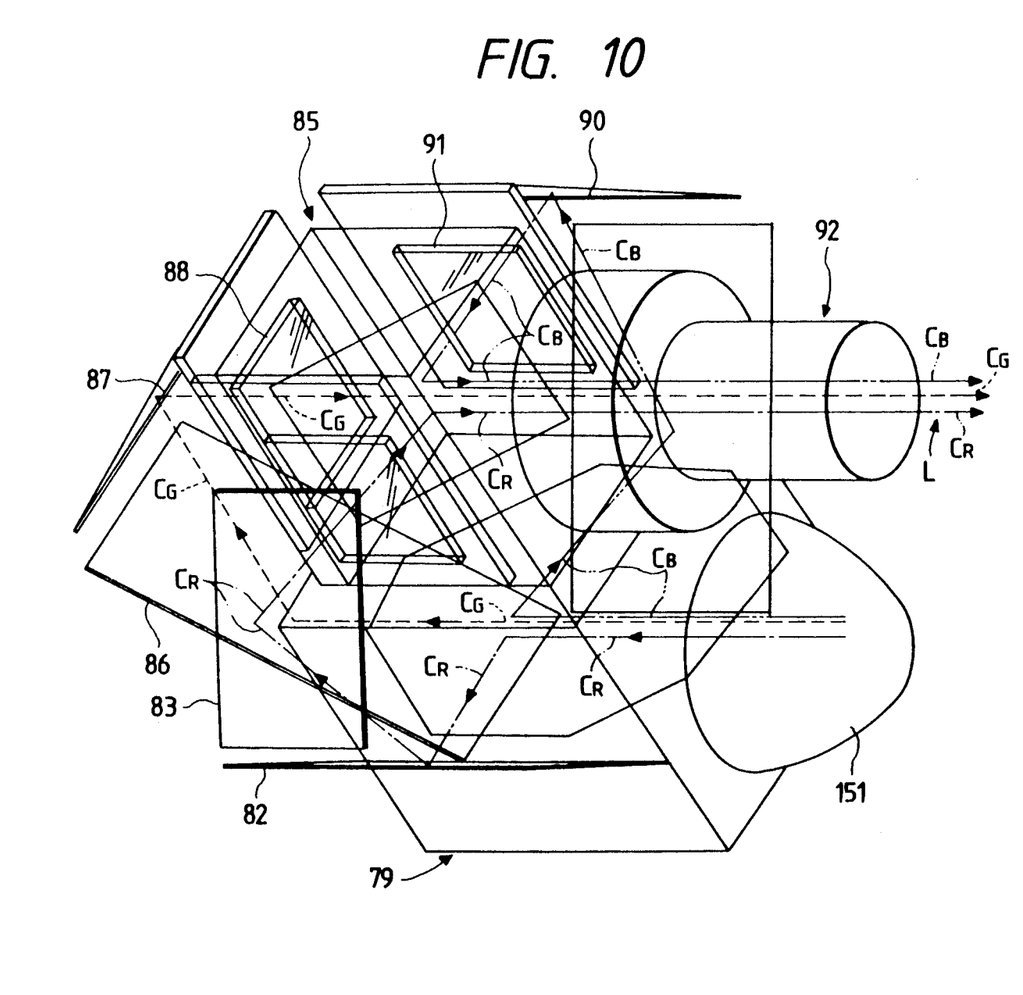
FIG. 10 is a perspective view showing a detailed internal structure of the liquid crystal projector of FIGS. 8 and 9.
Figure 11:
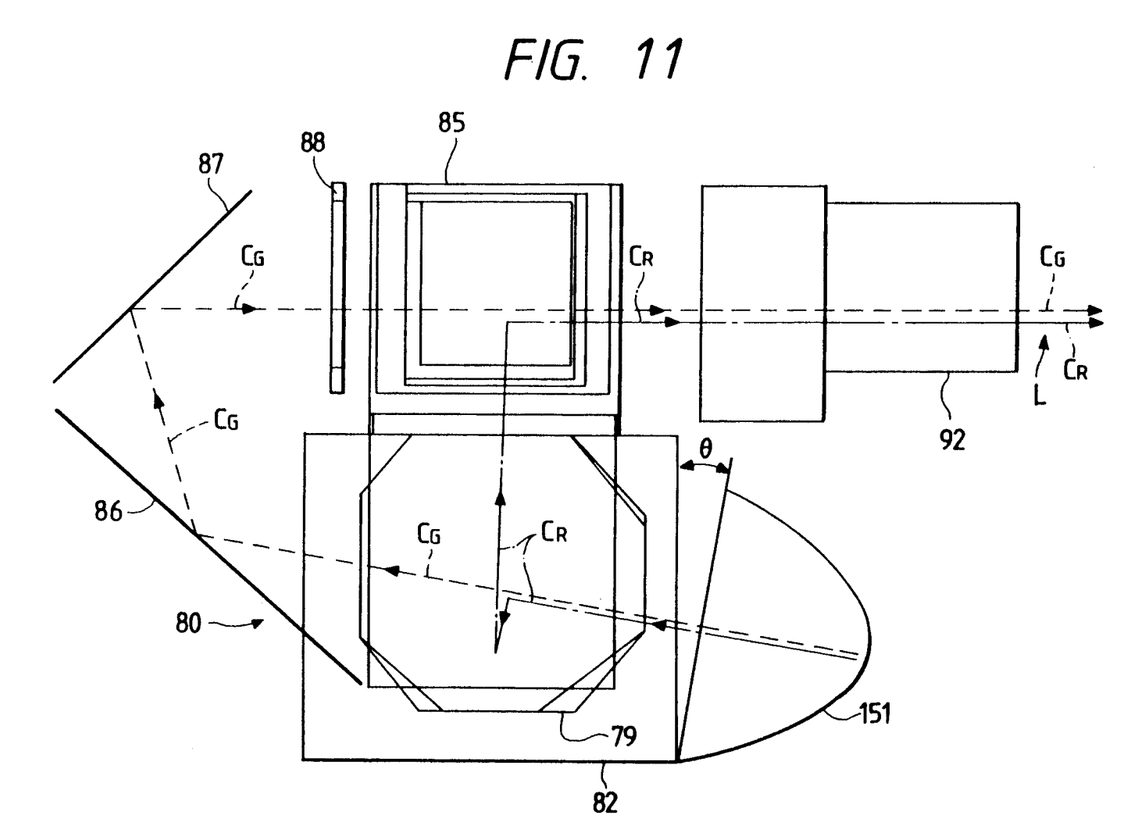
FIG. 11 is a front view of the liquid crystal projector of FIG. 10.

As shown in FIGS. 9-11, in the liquid crystal projector 80, white light $C_W$ reflected from the condensing reflector 151, which is associated with the light source 151a such as a halogen lamp or a metal halide lamp, is subjected to the elimination of its ultraviolet and infrared components, and then enters a first three-color separating/combining prism device 79. As shown in FIG. 11, the condensing reflector 151 is obliquely attached to the body 81 so that the optical axis of the condensing reflector 151 is inclined from the central axis of the projector lens 114. Red light $C_R$ separated by a dichroic mirror is reflected by full-reflection mirrors 82 and 83, passes through a liquid crystal panel 84 while its transmittance is varied, and enters a second three-color separating/combining prism device 85. Green light $C_G$ that has passed straight through the first three-color separating/combining prism device 79 is reflected by full-reflection mirrors 86 and 87, passes through a liquid crystal panel 88 while its transmittance is varied, and enters the second three-color separating/combining prism device 85. Blue light $C_B$ separated by a dichroic mirror of the first separating/combining prism device 79 is reflected by full-reflection mirrors 89 and 90, passes through a liquid crystal panel 91 while its transmittance is varied, and enters the second separating/combining prism device 85. In the second separating/combining prism device 85, the respective light beams $C_R$, $C_G$ and $C_B$ are combined by dichroic mirrors and output from a lens portion 92 having the projection lens 114 as light beams L consisting of R, G and B components.

As shown in FIG. 8, the liquid crystal projector 80 having the above structure has a small size of, for instance, 220 mm in height, 164 mm in width and 254 mm in depth. The present inventors conducted experiments for simulating the three-dimensional folding of the light beams using the liquid crystal projector 80 having an inclination angle $\theta$ of 6°. According to the experiments, it has been found that in the case of a 40-inch rear-projection television having the same height and width as the conventional television the cabinet thickness D (see FIG. 3) can be reduced to 376 mm, in contrast to 390 mm in the first embodiment. In the case of a 50-inch rear-projection television, the cabinet thickness D can be reduced to 432 mm.

EXPERIMENTS OF SECOND EMBODIMENT

The present inventors have also paid attention to a possibility that the cabinet height of the rear-projection television may be reduced according to the second embodiment. Experiments were made, on a trial-and-error basis, to determine to what extent the cabinet height can be reduced, i.e., to what extent the bottom of the cabinet can be raised, in addition to the reduction of the cabinet thickness, by inclining the optical axis of the reflector from the central axis of the projection lens and by subjecting the light beams emitted from the liquid crystal projector to two times of reflection.

Figure 12:
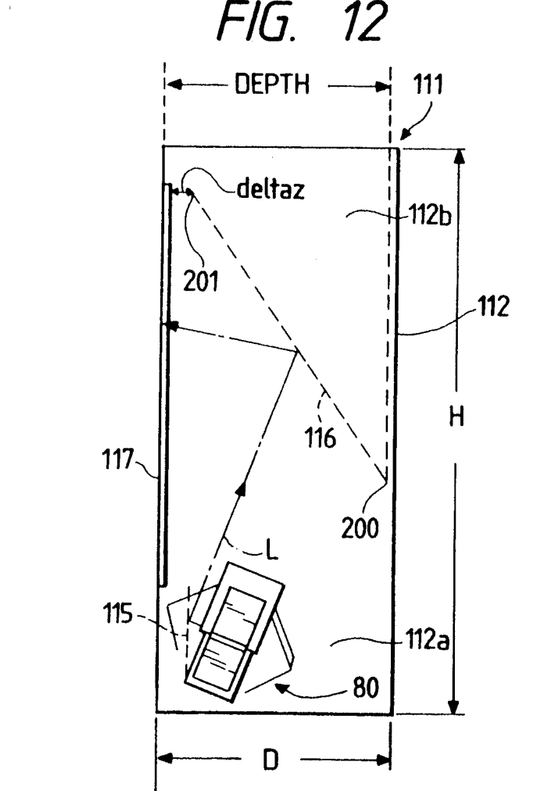
FIG. 12 is a side view showing an internal structure of the rear-projection television of the second embodiment.
Figure 13:
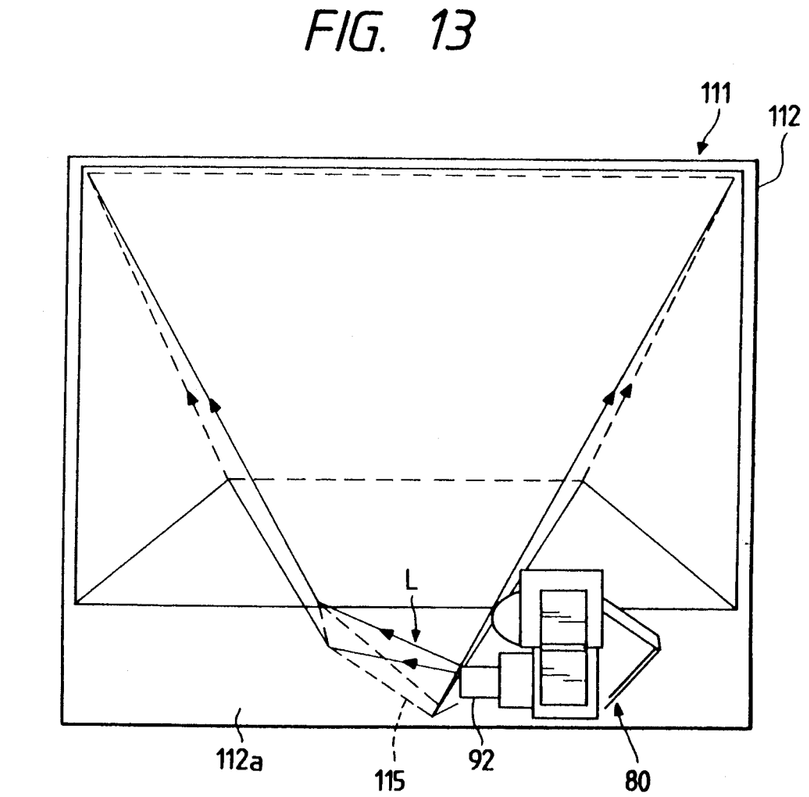
FIG. 13 is a rear view of the rear-projection television of FIG. 12.
Figure 14:
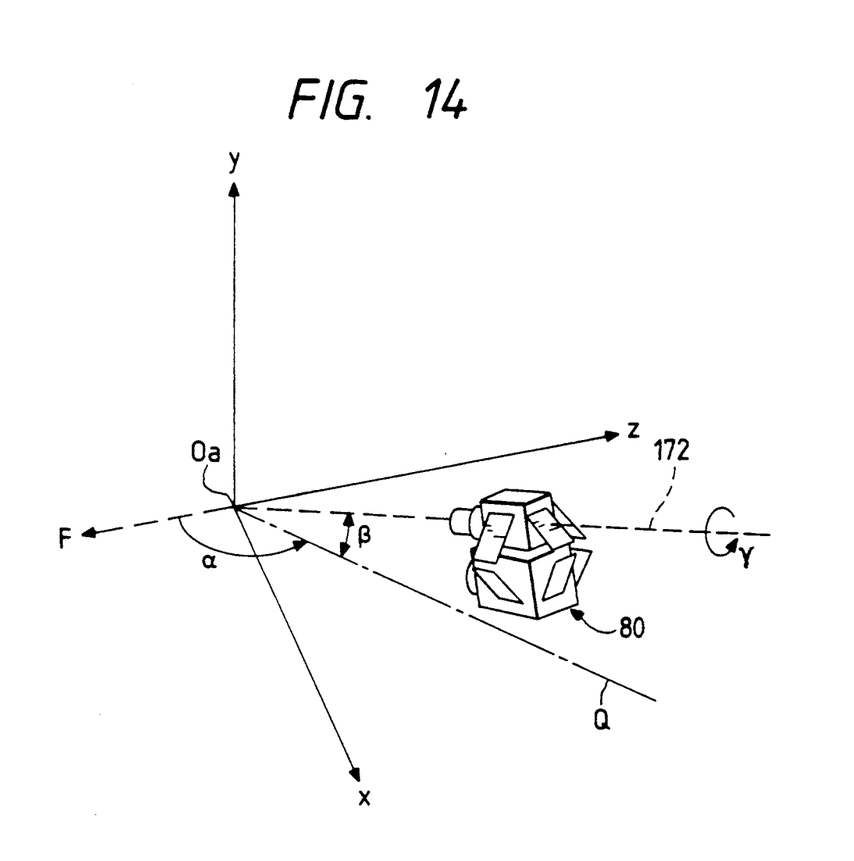
FIG. 14 shows an orientation of the liquid crystal projector in the rear-projection television of FIGS. 12 and 13.

FIGS. 12-14 show a television set according to the second embodiment with which the experiments were made. The light beams L of R, G and B are emitted from the lens portion 92, which includes the projection lens 114, of the liquid crystal projector 80 that is obliquely disposed in a lower portion 112a of a cabinet 112 of a liquid crystal type projection television 111. Two mirrors (at least two mirrors are required) for sequentially reflecting the light beams L are incorporated in the cabinet 112. In the second embodiment, the first mirror 115 is obliquely disposed on the front side of the lower portion 112a of the cabinet 112 and reflects the light beams L coming from the liquid crystal projector 80. The second mirror 116 is disposed in an upper portion 112b of the cabinet 112 so as to be inclined toward the front side and again reflects the light beams L coming from the first mirror 115. The screen 117 is provided at the front portion of the cabinet 112. The light beams L reflected from the second mirror 116 are made incident on the rear surface of the screen 117, as a result of which a color image is formed on the front surface of the screen 117. The first mirror 115 and second mirror 116 have shapes corresponding to those of the first mirror 15 and second mirror 16 of the first embodiment, and three-dimensionally folds back the optical axis of the light beams L. The cabinet thickness and height of this rear-projection television are represented by D and H, respectively.

In order to make the cabinet thickness D less than 500 mm, the present inventors set a dimension "depth" of FIG. 12 at 470 mm, and conducted experiments to determine to what extent the bottom of the cabinet 112 can be raised by the two-time reflections by the mirrors 115 and 116. As shown in FIG. 12, the depth dimension (mm) is a distance from the screen 117 to the most distant point 200 of the second mirror 116. Another dimension "deltaz" (mm) is a distance from the screen 17 to the nearest point 201 of the second mirror 116. A projection distance f is a distance from the projection lens 114 of the liquid crystal projector 80 to the screen 117 (see FIG. 7(b)).

In the xyz orthogonal coordinate system of FIG. 14, the x-y plane represents the surface of the screen 117, and the origin $O_a$ represents the center of the screen 117. Reference character F indicates the front side of the television. Character $\alpha$ represents a rotation angle of the central axis 172 of the projection lens of the liquid crystal projector 80 about the y axis, i.e., an angle formed by the -z axis and a line Q. Character $\beta$ represents an angle formed by the central axis 172 and the x-z plane, i.e., an angle formed by the central axis 172 and the line Q on the x-z plane. Character $\gamma$ represents a rotation angle of the liquid crystal projector 80 about the central axis 172 of the projection lens.

In order to determine the position of the first mirror 115, the normal vector of the first mirror 115 and one point on a plane of the first mirror 115 should be determined. Character y represents an intersection between this plane and the y-axis, and coordinates of the point y is (0, y, 0).

Relationships between the respective parameters and the size of the rear-projection television, which have been found by the experiments, are as follows.

(1) f (projection distance)

| | Merit | Demerit |
| --- | --- | --- |
| f → small | The bottom of the cabinet is raised. | If f is too small, the projector interrupts the path between the first and second mirrors. |
| f → large | The projector does not interrupt the | The bottom of the cabinet is lowered. |

-continued

| | Merit | Demerit |
| --- | --- | --- |
| | optical path. | |

(2) deltaz

| | Merit | Demerit |
| --- | --- | --- |
| deltaz → small | The bottom of the cabinet is raised. | A larger second mirror increases the cost. |
| deltaz → large | A smaller second mirror reduces the cost. | The bottom of the cabinet is lowered. |

(3) $\theta$ (inclination angle)

| | Merit | Demerit |
| --- | --- | --- |
| $\theta$ → small | The depth can be reduced. (The cabinet can be made thinner.) | The bottom of the cabinet is lowered. |
| $\theta$ → large | The bottom of the cabinet is raised. | The depth is increased. (The cabinet becomes thicker.) |

(4) $\beta$ ($-90° \leq \beta \leq 90°$)

| | Merit | Demerit |
| --- | --- | --- |
| $\beta \leq 20°$ | The optical path is not interrupted. | The bottom of the cabinet is lowered. The first mirror becomes larger. |
| $\beta > 20°$ | The bottom of the cabinet is raised. The first mirror becomes smaller. | The optical path is interrupted. |

(5) $\alpha$ ($0° \leq \alpha \leq 180°$)

If $90° \leq \alpha \leq 110°$, the bottom of the cabinet 112 can be raised relatively easily.

Considering the merits and demerits described above, the inventors searched for the best arrangement of the optical system in which the bottom of the cabinet 112 can be raised most and the entire cabinet 112 is made small, and have found that the arrangement of FIGS. 12 and 13 is most compact.

Various data of such an arrangement is shown in the following table, together with data of a case in which the depth dimension (see FIG. 12) is 500 mm.

| depth (mm) | f (mm) | inclination angle (deg.) | deltaz (mm) | ($\alpha,\beta$) (deg.) | y (mm) | $\gamma$ (deg.) | raised distance (mm) |
| --- | --- | --- | --- | --- | --- | --- | --- |
| 470 | 970 | 6 | 25 | (95, 5) | −470 | 90 | 197.9 |
| 500 | 980 | 6 | 20 | (90, 15) | −430 | −90 | 197.1 |

As a result, when the screen height and width were 600 mm and 800 mm, respectively, there were obtained the cabinet height H, width W and depth D of 881 (1078−197) mm, 860 mm and 500 mm, respectively.

It is noted that in the figures the same reference numerals and symbols represent the same or equivalent parts.

With the construction as described above, according to the invention, the cabinet thickness of the liquid crystal type rear-projection television can be made much thinner than the conventional ones.

Further, by inclining the optical axis of the reflector (which is associated with the light source) from the central axis of the projection lens, i.e., slightly offsetting the reflector so that the light beams enter the projection lens obliquely, the cabinet thickness can further be reduced, and the cabinet height can also be reduced to downsize the entire cabinet.

While the preferred embodiments of the invention are set forth for purposes of disclosure, modifications to the disclosed embodiments of the invention, as well as other embodiments thereof, may occur to those skilled in the art.

Accordingly, the appended claims are intended to cover all embodiments of the invention and modifications to the disclosed embodiments which do not depart from the spirit and scope of the invention.

What is claimed is:

1. A liquid crystal type rear-projection television comprising:
    a liquid crystal projector including light source means, liquid crystal panels for red, green and blue and a projection lens, for producing light beams of red, green and blue that carry a color image by passing while light provided by the light source means through the liquid crystal panels, and for outputting the light beams through the projection lens;
    at least two mirrors for sequentially reflecting the light beams coming from the liquid crystal projector; and
    a screen for receiving, at its rear surface, the light beams reflected from a last one of the at least two mirrors to display the color image at its front surface;
    wherein the liquid crystal projector and the at least two mirrors are arranged so that an optical axis of the light beams extending from the liquid crystal projector to the screen is folded back three-dimensionally; and
    wherein at least one of the at least two mirrors is arranged obliquely with respect to all of top-bottom, right-left and front-rear directions.

2. The liquid crystal type rear-projection television of claim 1, wherein the liquid crystal projector is disposed so as to deviate from a center of the rear-projection television in the right-left direction.

3. The liquid crystal type rear-projection television of claim 1, wherein at least one of the at least two mirrors has an irregular tetragon reflection plane.

4. The liquid crystal type rear-projection television of claim 1, wherein an optical axis of the light source means is inclined from a central axis of the projection lens of the liquid crystal projector.

5. The liquid crystal type rearprojection television of claim 4, wherein the liquid crystal projector further includes a first three-color separating/combining prism device for separating the white light provided from the light source means into three light beams to be input to the respective liquid crystal panels, and a second three-color separating/combining prism device for combining the light beams provided from the respective liquid crystal panels to form a single light beam carrying the color image.

6. A liquid crystal type rear-projection television comprising:
    a liquid crystal projector including light source means, liquid crystal panels for red, green and blue and a projection lens, for producing light beams of red, green and blue that carry a color image by passing white light provided by the light source means through the liquid crystal panels, and for outputting the light beams through the projection lens;
    at least two mirrors for sequentially reflecting the light beams coming from the liquid crystal projector; and
    a screen for receiving, at its rear surface, the light beams reflected from a last one of the at least two mirrors to display the color image at its front surface;
    wherein the liquid crystal projector and the at least two mirrors are arranged so that an optical axis of the light beams extending from the liquid crystal projector to the screen is folded back three-dimensionally; and
    wherein the at least two mirrors consist of first and second mirrors, and wherein the optical axis of the light beams is expressed as:

$$Nm_2 = aNm_1 + bY$$

where a and b are constants, $Nm_1$ is a vector along a normal of the first mirror, $Nm_2$ is a vector along a normal of the second mirror, and Y is a vector along a shorter axis of the second mirror.

7. A method of displaying a color image in a liquid crystal type rear-projection television, comprising the steps of:
    arranging a liquid crystal projector, at least two mirrors and a screen so that an optical axis of a light beam extending from the liquid crystal projector to the screen via the at least two mirrors is folded back three-dimensionally and that at least one of the at least two mirrors is arranged obliquely with respect to all of top-bottom, right-left, and front-rear directions;
    producing light beams of red, green and blue that carry a color image by the liquid crystal projector;
    sequentially reflecting the light beams coming from the liquid crystal projector by the at least two mirrors; and
    projecting the light beams reflected from a last one of the at least two mirrors to a rear surface of the screen to display the color image at its front surface.

* * * * *

UNITED STATES PATENT AND TRADEMARK OFFICE
CERTIFICATE OF CORRECTION

PATENT NO. : 5,278,595
DATED : January 11, 1994
INVENTOR(S) : Masami NISHIDA et al It is certified that error appears in the above-indentified patent and that said Letters Patent is hereby corrected as shown below:

Claim 5, column 9, line 58, change "rearprojection" to --rear-projection--.

Signed and Sealed this

Thirtieth Day of August, 1994

Attest:

BRUCE LEHMAN

*Attesting Officer*      *Commissioner of Patents and Trademarks*